Aug. 29, 1933.   G. W. HEISE   1,924,314
ELECTRIC BATTERY
Filed March 13, 1930
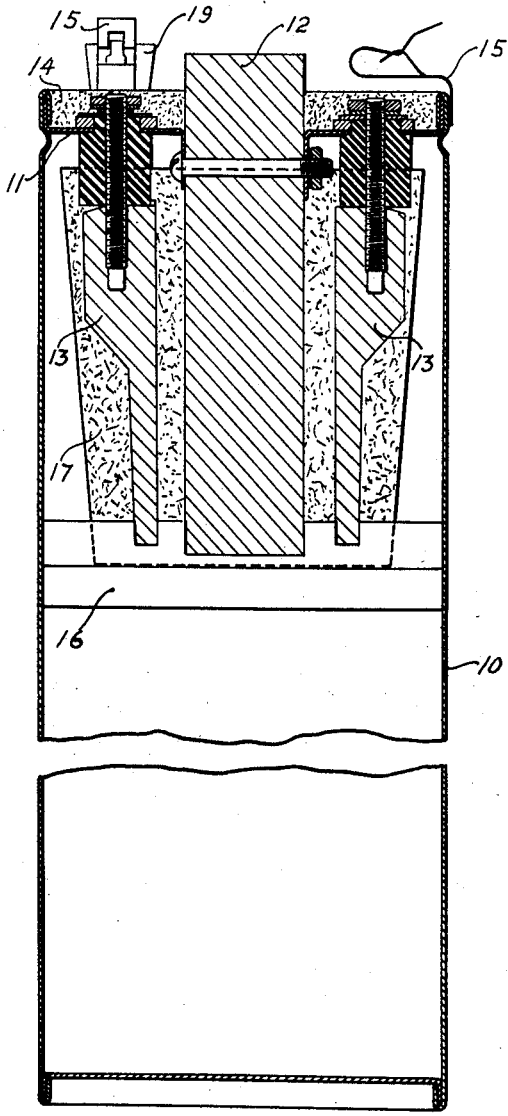
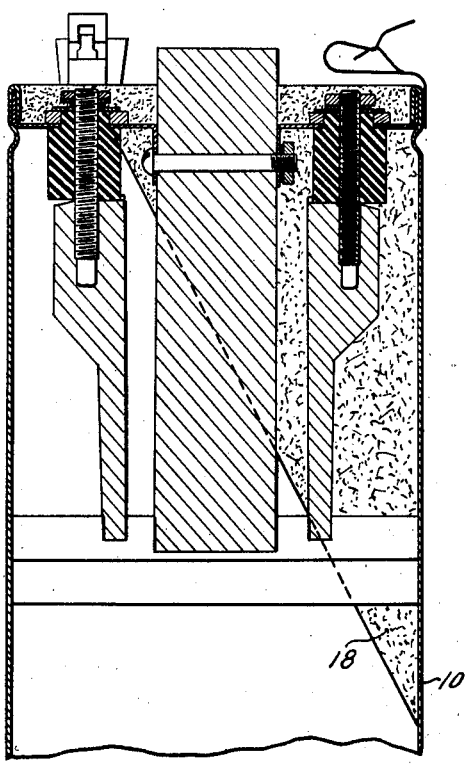
George W. Heise, INVENTOR,
BY
Byrnes Townsend & Potter, ATTORNEYS.

Patented Aug. 29, 1933

1,924,314

UNITED STATES PATENT OFFICE 1,924,314

ELECTRIC BATTERY

George W. Heise, Lakewood, Ohio, assignor to National Carbon Company, Inc., a Corporation of New York Application March 13, 1930. Serial No. 435,580

8 Claims. (Cl. 136—86)

This invention pertains in general to electric batteries of the type employing voltaic elements and liquid electrolyte having a solid ingredient therein such as caustic soda, and more specifically to a method of preparing caustic soda and incorporating it in such a battery so the advantages described hereinafter are attained.

In my patent application, Serial No. 281,459, filed May 29, 1928, (now Patent No. 1,863,791, granted June 21, 1932) I disclosed that, "A hydrated caustic substance suitable for such batteries may be produced by the combination of a solid anhydrous alkali hydroxide with a suitable amount of water. If sodium hydroxide is used, the water should be approximately a quantity equivalent to not over about 45 percent by weight of the caustic sodium hydroxide. A mixture of caustic soda and water in this proportion evolves a large quantity of heat and forms a liquid which, upon cooling, hardens to a dry solid having the approximate formula:

$$NaOH.H_2O$$

This may be considered as the monohydrate of sodium hydroxide and may be formed by the above described method, or in any other convenient way as by discontinuing the dehydration of the original caustic soda at an appropriate point. The material, which is hard and dense and dissolves readily in water may be used in agglomerated form for battery electrolyte. It may also desirably be crushed after solidifying, or, if stirred during the cooling process it may be produced directly in granules of convenient size. The resultant granular product is highly desirable for use in the preparation of battery electrolyte. It is likewise nondusting and upon solution produces a much less quantity of heat. It is found that when the monohydrate is dissolved in water to produce the desirable 20% to 25% solution of caustic for the battery, the solution temperature may be approximately 30° C. lower than the temperature obtained under similar conditions by the use of anhydrous caustic."

It was also pointed out in this application that under certain conditions it is desirable to ship such batteries complete, with the exception of fluid, so they may be prepared for service by the addition of water only.

Caustic soda cells in general are entirely satisfactory when manufactured, shipped and prepared for service in this manner if adequate means are provided to ensure uniform solution. With certain types, e.g., air depolarized cells, special precautions are desirable to obtain maximum efficiency. Thus the cathode in such batteries, though impermeable to electrolyte, may not be entirely waterproof, and consequently may be injured by contact with water added to the battery before the solution has reached a safe concentration. Therefore, one object of this invention is to provide means for protecting the cathode from the water added to the battery until the hydrated caustic is substantially dissolved.

Also, since these electrodes may be affected deleteriously by contact with hot solution, a further object is to provide means of reducing the solution temperature when the hydrated caustic is dissolved.

The voltaic elements of such a battery, and especially the cathode, are frequently fragile and consequently are liable to breakage during shipment and handling, although strong enough to withstand the shocks of service. Therefore, another object of this invention is to provide a means for supporting the elements during shipment that is automatically removed when the battery is placed in service.

Other aims, objects, and novel features, will be apparent from the following description and the accompanying illustration, in which:

Fig. 1 is a vertical section of my improved battery showing the hydrated caustic soda cast in a block around the battery elements, and;

Fig. 2 is a similar view showing the hydrated caustic soda solidified in the top of the container partially around the elements.

My complete invention may take a variety of forms according to size and shape of the battery in which it is incorporated, and also according to the shape and position of the elements in the battery, but the preferred form shown in the accompanying drawing comprises a container 10 of metal or other suitable material having a cover 11 from which a cathode 12 and two anodes 13, which form the voltaic elements of the battery, are suspended in a suitable manner. The cathode 12 projects upward through the cover 11 to the outer air. The anodes 13 are electrically connected by a conductor imbedded in a sealing compound 14 of any suitable thermoplastic material employed to form a liquid tight closure. Suitable wire terminals 15 are electrically connected to the respective elements and serve as a convenient means of making electrical connection with the battery. A support 16 of insulating material is carried by the sides of the container 10 and serves to hold the elements 12 and 13 in properly spaced relation and also support them somewhat during use.

A suitable quantity of hydrated caustic soda to form the solid ingredient of the battery electrolyte is either cast in a solid block 17 around and completely enclosing the lower portions of the voltaic elements of the battery, as shown in Fig. 1; or solidified in a solid block 18 at the top of the container 10 and more or less completely enclosing the voltaic elements, as shown in Fig. 2.

In forming the block 17 the voltaic elements of the battery are placed in a suitable mold and the molten hydrated caustic soda is poured in the mold around the elements where it is allowed to freeze or harden. As hydrated caustic soda melts at about 60° C. this procedure is feasible without injuring the voltaic elements by the heat of the molten caustic.

In forming the block 18 molten caustic is poured into the completed battery through an opening 19, provided for filling the battery with water when it is placed in service, and then allowed to freeze or harden while the battery is held in a suitable position with the top downward so the caustic does not cover the filler opening, as in that case the hardened caustic would seal the filler opening and prevent the addition of water when placing the battery in service.

Hydrated caustic soda incorporated in a battery in this manner supports the voltaic elements from the time the battery is manufactured until it is placed in service, at which time it is automatically removed by the water added to form the electrolyte. As the caustic is in the form of a solid block it will dissolve more slowly than when in a more finely divided state and consequently a lower solution temperature will result. Therefore, the cathode will not be injured as might be the case if the caustic were in another form.

Furthermore, the caustic surrounds the cathode and prevents water from coming in contact with it until enough caustic has been dissolved so that the cathode is impermeable to the solution.

It has been found in practice, when batteries are prepared in this manner, that the anodes are not appreciably corroded when imbedded in hydrated caustic soda for long periods of time, and the cathodes are protected from water, moisture, and atmospheric conditions that might otherwise cause deterioration in the elements were they unprotected. Also, various modifications in the form and arrangement of the component parts of the battery may be made, and equivalent materials may be substituted for those specified without departing from the invention or sacrificing any of the rights thereunder.

I claim:

1. An electric battery of the type employing voltaic elements and liquid electrolyte formed by the solution of a solid ingredient, said solid ingredient being cast in a block around said elements.

2. An electric battery of the type employing voltaic elements and an electrolyte comprising a solid ingredient to which water is added when said battery is placed in service, and means comprising said solid ingredient for preventing said water from coming in contact with substantially the entire surface of said elements until said solid ingredient is partially dissolved.

3. An electric battery comprising a container; a plurality of voltaic elements suspended in said container; and a soluble material cast in a block around said elements and adapted to be dissolved to form the electrolyte for said battery.

4. An electric battery comprising a container; a plurality of voltaic elements suspended in said container; and a cast block of hydrated caustic soda enclosing said elements and adapted to be dissolved to form the electrolyte for said battery.

5. An electric battery comprising a container; a plurality of voltaic elements suspended in said container; and a cast of electrolyte-forming material in contact with the inner walls of said container, and in which said elements are imbedded.

6. An electric battery comprising a container; a plurality of voltaic elements suspended in said container; and a cast of hydrated caustic soda supported by said container and in which said elements are imbedded.

7. An electric battery comprising a container; a plurality of voltaic elements suspended in said container; and a cast of hydrated caustic soda formed in said container around said elements.

8. The combination in an electric battery of the type including voltaic elements, one of which elements is formed of carbon, and an electrolyte comprising a solid ingredient to which water is added when said battery is placed in service, of means comprising said solid ingredient for preventing said water from coming in contact with substantially the entire surface of said carbon element until said solid ingredient is partially dissolved.

GEORGE W. HEISE.